United States Patent
Mahasenan et al.

(10) Patent No.: US 9,030,963 B2
(45) Date of Patent: May 12, 2015

(54) ANALYZING A NETWORK TOPOLOGY

(71) Applicant: Honeywell International Inc., Morristown, NJ (US)

(72) Inventors: Arun Vijayakumari Mahasenan, Trivandrum (IN); Uday K. Pulleti, Machilipatnam (IN)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 13/692,601

(22) Filed: Dec. 3, 2012

(65) Prior Publication Data

US 2014/0153438 A1    Jun. 5, 2014

(51) Int. Cl.
*H04W 24/00* (2009.01)
*H04L 12/24* (2006.01)
*G01S 5/02* (2010.01)
*H04W 64/00* (2009.01)
*G01S 17/08* (2006.01)

(52) U.S. Cl.
CPC ......... *H04L 41/0866* (2013.01); *G01S 5/0284* (2013.01); *H04W 64/00* (2013.01); *G01S 17/08* (2013.01); *G01S 5/0263* (2013.01)

(58) Field of Classification Search
USPC ........................................................ 340/993
See application file for complete search history.

(56) References Cited

U.S. PATENT DOCUMENTS

| | | | |
|---|---|---|---|
| 2003/0130039 A1* | 7/2003 | Nelson | 463/42 |
| 2004/0203380 A1* | 10/2004 | Hamdi et al. | 455/41.2 |
| 2005/0165922 A1* | 7/2005 | Hatano | 709/223 |
| 2005/0261004 A1* | 11/2005 | Dietrich et al. | 455/456.2 |
| 2007/0032245 A1* | 2/2007 | Alapuranen | 455/456.1 |
| 2008/0218334 A1* | 9/2008 | Pitchers et al. | 340/539.1 |
| 2009/0066473 A1* | 3/2009 | Simons | 340/3.1 |
| 2012/0035110 A1* | 2/2012 | Grillberger et al. | 514/14.1 |
| 2012/0126974 A1* | 5/2012 | Phillips et al. | 340/539.13 |

FOREIGN PATENT DOCUMENTS

WO     2011144795     11/2011

* cited by examiner

*Primary Examiner* — Shaq Taha
(74) *Attorney, Agent, or Firm* — Brooks, Cameron & Huebsch, PLLC

(57) ABSTRACT

Systems, methods, and devices for analyzing a network topology are described herein. For example, one or more embodiments include receiving data from a node in a node array with a locating device, determining a position of the locating device, determining a position of the node in relation to the locating device based on the data received from the node and the position of the locating device, comparing the position of the node to a defined layout of the node array, and determining whether the position of the node matches a defined position in the defined layout of the node array.

19 Claims, 3 Drawing Sheets

ANALYZING A NETWORK TOPOLOGY

TECHNICAL FIELD

The present disclosure relates to analyzing a network topology.

BACKGROUND

Nodes can be placed at various locations in a structure to distribute data and/or collect data. For example, a node can include a sensor, a wireless router, and/or a camera. During installation of nodes, a site survey team can design a network topology for the placement of the nodes. The design can be provided to a contractor, who can install the nodes according to the design. However, mistakes can be made by the contractor, resulting in an incorrect placement of one or more of the nodes.

As such, incorrect placement of a node can affect distribution and/or collection of data. For instance, an incorrectly placed wireless router can result in an area not receiving a wireless signal and/or an area receiving a degraded wireless signal. Alternatively, and/or in addition, data and/or images may not be collected from an area if a sensor and/or camera is placed in an incorrect area.

DETAILED DESCRIPTION

Figure 1:
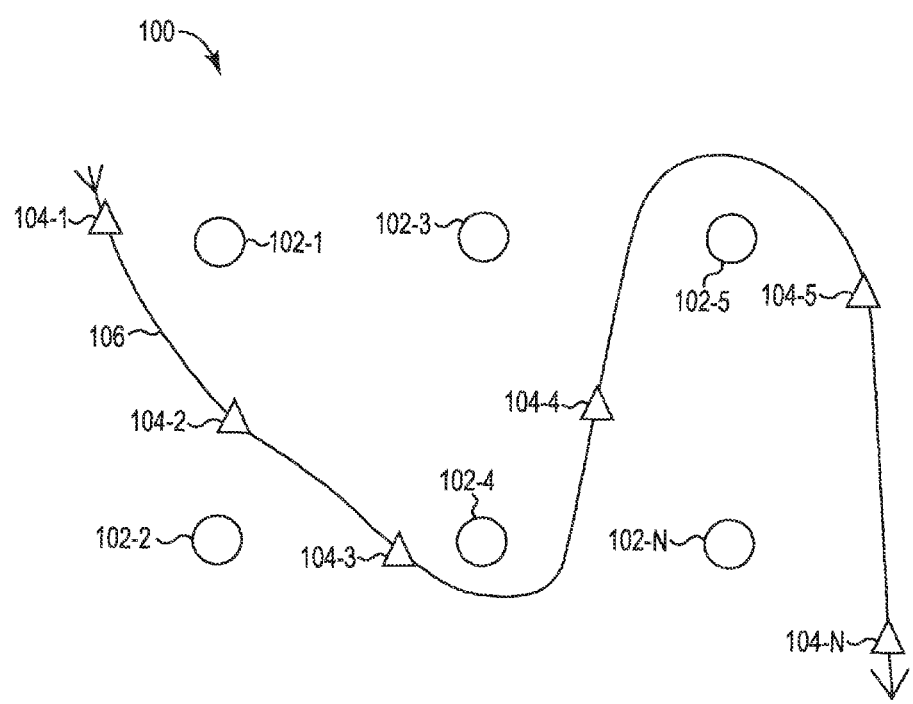
FIG. 1 illustrates a system for analyzing a network topology according to one or more embodiments of the present disclosure.

Systems, methods, and devices for analyzing a network topology are described herein. For example, one or more embodiments include receiving data from a node in a node array with a locating device, determining a position of the locating device, determining a position of the node in relation to the locating device based on the data received from the node and the position of the locating device, comparing the position of the node to a defined layout of the node array, and determining whether the position of the node matches a defined position in the defined layout of the node array.

As discussed herein, nodes can be placed at various locations in a structure to distribute data and/or collect data. For example, a wireless router can be placed in the structure to distribute and/or collect data; a sensor (e.g., smoke detector) can be placed in the structure to collect data (e.g., data associated with a fire), and/or a camera can be placed in the structure to collect images for use in security monitoring. Placement of the nodes can be important for proper distribution and/or collection of data. In an example, an improper placement of a node can result in data not being distributed and/or collected for a portion of the structure.

For instance, if a first node is placed too far from a second node, data may not be collected and/or distributed at a point that is between the first node and the second node. Alternatively, and/or in addition, if a node is placed on a first side of a wall, instead of a second side of the wall, data may not be collected and/or distributed for areas that are located on a same side as the second side of the wall.

The nodes can be installed in particular locations according to a network topology designed by a site survey team. The network topology can include a defined layout of a node array, for example. The defined layout of the node array can be a design that specifies where each node should be installed so that data can be properly distributed and/or collected by each node. In an example, the defined layout of the node array can be designed by a survey team. The design can then be used by a contractor, who can install the nodes according to the design. However, an error can be made by the contractor, which can result in a node that is placed in an incorrect location. As such, a performance of the incorrectly installed node may not match an anticipated performance of the designed network topology.

Some embodiments of the present disclosure can analyze a network topology to determine whether nodes have been installed according to a designed network topology. In an example, data can be collected from nodes in a structure with a locating device and a position of the nodes can be determined. The determined position of the node can be compared to the designed network topology and a determination can be made of whether the installed nodes have been installed in the correct location.

For example, an individual can walk through a structure with a locating device that collects data from the nodes and uses the data to determine the location of the nodes. A determination can then be made whether the nodes have been installed according to a designed network topology.

Some embodiments of the present disclosure can analyze a health of a node array. In an example, the locating device can be used to determine whether a node in the node array is operational.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As will be appreciated, elements shown in the various embodiments herein can be added, exchanged, and/or eliminated so as to provide a number of additional embodiments of the present disclosure. As used herein, "a" or "a number of" refers to one or more. In addition, as will be appreciated, the proportion and the relative scale of the elements provided in the figures are intended to illustrate the embodiments of the present invention, and should not be taken in a limiting sense.

FIG. 1 illustrates a system for analyzing a network topology according to one or more embodiments of the present disclosure. The system 100 can include a locating device. The locating device can be, for example, a mobile device (e.g., cellular phone, smart phone, personal digital assistant (PDA), handheld computing device, etc.). Alternatively, and/or in addition, the locating device can be a mobile device, which can be, for example, a personal and/or business computer (e.g., laptop, tablet) among other types of computing devices.

The locating device can be moved along a locating device path 106 to receive data from nodes 102-1, 102-2, 102-3, 102-4, 102-5, 102-N, generally referred to herein as node 102, in a node array. For example, the locating device can be moved along the locating device path 106 to receive data from a first node 102-1, a second node 102-2, a third node 102-3, a fourth node 102-4, and/or an N node 102-N. In an example, the locating device can be moved along a locating device path 106 by a user. For instance, the user can hold the locating device and can walk along the locating device path 106 with the locating device.

As the locating device is moved along the locating device path 106, a position of the locating device 104-1, 104-2, 104-3, 104-4, 104-5, 104-N, generally referred to herein as position of locating device 104, can be determined on a node array map. For example, a first position of the locating device 104-1, second position of the locating device 104-2, third position of the locating device 104-3, fourth position of the locating device 104-4, fifth position of the locating device 104-5, and/or N position of the locating device 104-N can be determined on the node array map.

In an example, the node array map can be defined as a map that includes a plan of an area where the node array is installed. For example, the node array map can be a map that includes a floor plan and/or ceiling plan of an area where the node array is installed. The map can be a 2-dimensional and/or a 3-dimensional map. The node array map can include reference features that can be used to determine the position of the locating device. For example, the reference features can include columns, stairs, windows, doors, and/or walls in an area (e.g., structure) where the node array is installed.

In some embodiments, the position of the locating device on the node array map can be determined automatically. The position of the locating device can be determined through a global positioning system. Alternatively, and/or in addition, the position of the locating device can be determined through an indoor navigation system. For example, an indoor navigation system that uses dead reckoning can be used to determine the position of the locating device. Alternatively, and/or in addition, a wireless signal from a network (e.g., Wi-Fi, cellular) can be used to determine the position of the locating device Alternatively, and/or in addition, as the user walks along the locating device path 106 with the locating device, the user can enter the position of the locating device in relation to the reference features. In an example, a prompt can be provided by the locating device to the user to enter the position of the locating device. For instance, a prompt can be displayed on a user interface of the locating device, and/or an audible prompt can be generated by the locating device.

In an example, a user can be standing next to a reference feature (e.g., column). As such, the user can identify the reference feature on the node array map and enter the position of the locating device as being next to the reference feature. Alternatively, and/or in addition, the node array map can include a measurement grid along with the reference features. The measurement grid can be used for determining the position of the locating device. In an example, if the user is standing a distance away from the reference feature, the user can measure the distance between the user and/or locating device with a measuring device (e.g., tape measure, laser distance measurer) and use the distance to determine the position of the locating device in relation to the reference feature. For example, the measurement grid can be divided into inches and/or feet, which can allow the user to determine where the locating device is on the node array map using the measured distance away from the reference feature.

In some embodiments, the measuring device can be built into, attached to, and/or in communication with the locating device. For example, a laser distance measurer can be built into the locating device, attached to, and/or in communication with the measuring device through a wireless signal (e.g., Bluetooth). The laser distance measurer can be activated through the user interface of the locating device and/or can be activated with a switch separate from the user interface.

In some embodiments, the user can specify on the user interface the measurement that will be taken with the built in laser distance measurer. In an example, the user can place two indicators on the node array map being displayed by the user interface of the locating device. For instance, the user can place a dot where the locating device is on the node array map and can place a dot on and/or next to a reference point via a user interface that includes a touch screen. The distance between the two indicators can represent the measured distance away from the reference feature. In an example, the laser distance measurer can be activated and can be used to measure the distance between the two indicators.

In an example, upon measurement of the distance between the two indicators, the distance can be automatically associated with the distance between the two indicators. Alternatively, and/or in addition, the user can make a selection to associate the measured distance with the distance between the two indicators. Alternatively, and/or in addition, the user can manually enter the measured distance for the distance between the two indicators.

Alternatively, and/or in addition, the node array map can include a defined layout of the node array. In an example, the defined layout of the node array can be a network topology. For instance, the defined layout of the node array can be a design for where the nodes in the node array should be installed.

In some embodiments, the position of the node 102 can be determined in relation to the locating device based on the data received from the node 102 and the position of the locating device on the node array map. In an example, the position of the node 102 can be determined based on coordinates of the node 102 and/or the locating device.

In an example, the data received from the node 102 can include a time of flight data of a signal from the node 102, signal strength data, and/or directional signal data. Time of flight data can be defined as a time for the signal to travel from the node 102 and be received at the locating device. The time of flight data can be used to determine a distance from the node 102 to the position of the locating device 104, which can be used to determine the position of the node 102, as discussed herein.

The signal strength data can be defined as a magnitude of the electric field of the signal from the node 102 that is received at the locating device. In an example, the signal strength of the signal from the node 102 can be detected and used to determine the position of the node 102. For instance, the signal strength of a signal from the first node 102-1 can be detected with the locating device at the first position of the locating device 104-1 and the second position of the locating device 104-2. Alternatively, and/or in addition, the signal from the first node 102-1 can be detected at the third position of the locating device 104-3, the fourth position of the locating device 104-4, the fifth position of the locating device 104-5, and/or the N position of the locating device 104-N. Based on the change of signal strength, the position of the node 102 can be determined.

The directional signal data can be defined as data indicating a direction by which the signal is received by the locating device. In an example, the locating device can include a directional antenna. The directional antenna can receive the signal from the node 102 and a direction by which the signal is received can be determined by the locating device.

In an example, the data from the node 102 can be received from a plurality of positions with the locating device. For instance, the locating device can be moved to the first position of the locating device 104-1, second position of the locating device 104-2, third position of the locating device 104-3, fourth position of the locating device 104-4, fifth position of the locating device 104-5, and/or N position of the locating device 104-N on the node array map. At some and/or all of the positions, data can be received from the node 102. For example, data can be received from the first node 102-1 at the first position of the locating device 104-1, the second position of the locating device 104-2, the third position of the locating device 104-3, the fourth position of the locating device 104-4, the fifth position of the locating device 104-5, and/or the N position of the locating device 104-N.

In an example, the time of flight data can be received from the plurality of positions with the locating device. The time of flight data can then be used to triangulate the position of the node in the node array. For instance, the time of flight data for the signal from the first node 102-1 can be received by the locating device at the first position of the locating device 104-1 and the second position of the locating device 104-2.

Based on the speed of the signal and the time of flight for the signal from the node 102 and the position of the locating device on the node array map, the location of the node 102 in the node array can be determined. For instance, the distance between the first position of the locating device 104-1 and the second position of the locating device 104-2 can be determined; and the distance between the first node 102-1 and the first position of the locating device 104-1 and the distance between the first node 102-1 and the second position of the locating device 104-2 can be determined, which can be used to determine the position of the first node.

In some embodiments, a determination of whether the position of the node 102 matches a defined position in a defined layout of the node array can be made. For example, as discussed herein, the defined layout of the node array can specify where each node 102 should be installed in the design so that data can be properly distributed and/or collected by each node. The defined layout of the node array can include identifications for each node that is associated with each defined position, respectively. For example, a node can be assigned a first numerical identification that is associated with each defined position.

In some embodiments, the defined position in the defined layout of the node array can include coordinates for the defined position. In an example, the coordinates for the position of the node 102 can be compared to coordinates for the defined position. For instance, the locating device can receive data from the node 102 that includes an identification for the node 102. Alternatively, and/or in addition, the position (e.g., coordinates) of the node 102 can be determined. The identification for the node 102 can be used to look up a corresponding identification for a node in the defined layout of the node array and the defined position. In an example, the coordinates for the position of the node 102 can be compared with the coordinates for the defined position, and the determination of whether the position of the node matches the defined position in the defined layout of the node array can be made.

In some embodiments, a determination of a change to make to the position of the node 102 to match the position of the node 102 to the defined position in the defined layout of the node array can be made. In an example, coordinates for the defined position can be compared to coordinates for the position of the node 102 and a difference between the coordinates for the defined position and the coordinates for the position of the node 102 can be determined.

In some embodiments, the difference between the coordinates for the defined position and the coordinates for the position of the node 102 can be displayed to the user as a determined change for how to change the position of the node 102 to match the defined position in the defined layout of the node array. In an example, a determined change can be generated, which states that the node 102 should be moved by a distance to match the position of the node 102 to the defined position in the defined layout of the node array. For instance, the change can include a recommendation to move the node 102 by a first distance along a first axis, a second distance along a second axis, and/or a third distance along a third axis to match the position of the node 102 to the defined position in the defined layout of the node array.

In some embodiments, where the position of the node 102 has been verified as matching the defined position in the defined layout of the node array, the position of the node 102 can be used to determine the position of the locating device. For example, if a determination has been made that the position of the first node 102-1 matches the defined position in the defined layout of the node array and the position of the second node 102-2 matches the defined position in the defined layout of the node array, the time of flight data, signal strength data, and/or directional signal data from the signal from the first node 102-1 and/or second node 102-2 can be used to determine the position of the locating device on the node array map. For instance, the position of the first node 102-1 and the second node 102-2 can be used to triangulate the position of the locating device.

Figure 2:
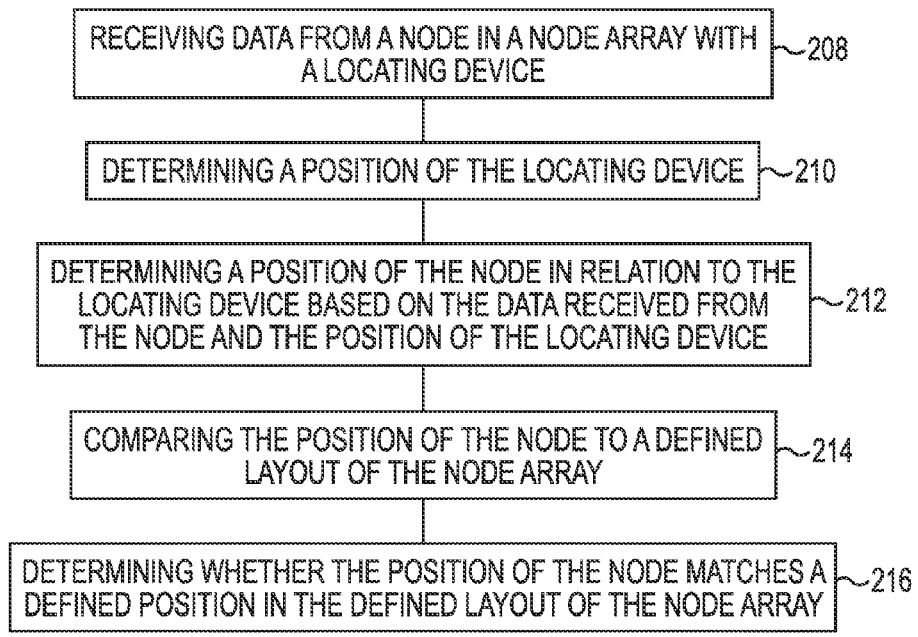
FIG. 2 illustrates a method for analyzing a network topology according to one or more embodiments of the present disclosure.

FIG. 2 illustrates a method for analyzing a network topology according to one or more embodiments of the present disclosure. The method includes receiving data from a node in a node array with a locating device, at block 208. In an example, the node can include a sensor, camera, and/or wireless router. The sensor can include, for example, an acoustic sensor (e.g., microphone), chemical sensor (e.g., smoke detector, carbon dioxide detector), thermal sensor (e.g., thermometer), pressure sensor, optical sensor (e.g., photoswitch), although examples are not so limited.

In some embodiments, the data from the node can include time of flight data, signal strength data, and/or directional signal data from a signal from the node, as discussed herein. The data from the node can be used to determine the position of the node in a manner analogous to that discussed in relation to FIG. 1.

In an example, the data from the node in the node array can be received from a plurality of positions with the locating device. By receiving the data from the node in the node array from the plurality of positions with the locating device, triangulation can be used to determine the position of the node, as discussed herein.

At block 210, the method includes determining a position of the locating device. In an example, the position of the locating device can be determined on a node array map. The node array map can include a floor plan of an area where the node array is installed.

In an example, the node array map can include reference features that can be used to determine the position of the locating device. For instance, the reference features can include columns, stairs, windows, doors, and/or walls in an area (e.g., structure) where the node array is installed.

In some embodiments, the position of the locating device can be determined based on a position of the locating device entered by a user. In an example, the user can enter the position of the locating device based on the reference features in the node array map. For instance, if the user is standing in a doorway with the locating device, the user can enter the position of the locating device as being in the doorway.

The method includes, at block 212, determining a position of the node in relation to the locating device based on the data received from the node and the position of the locating device. In an example, as discussed herein, the position of the node can be triangulated using the received data from the node in the node array from the plurality of positions and the position of the locating device.

For instance, based on the speed of the signal and the time of flight for the signal from the node in the node array and the position of the locating device on the node array map, the location of the node in the node array can be determined. For instance, the distance between a first position of the locating device and a second position of the locating device can be determined; and the distance between a first node and the first position of the locating device and the distance between the first node and the second position of the locating device can be determined, which can be used to triangulate the position of the first node.

At block 214, the method includes comparing the position of the node to a defined position in the defined layout of the node array. In an example, coordinates of the position of the node can be compared to coordinates of the defined position in the defined layout of the node array.

The method includes determining whether the position of the node matches the defined position in the defined layout of the node array, at block 216. In an example, the coordinates of the position of the node can be compared to coordinates of the defined position in the defined layout of the node array and a determination can be made whether the coordinates are within a defined range from one another. If the coordinates are within the defined range from one another, then a determination can be made that the position of the node matches the defined position in the defined layout of the node array. Alternatively, and/or in addition, if the coordinates are not within the defined range from one another, a determination can be made that the position of the node does not match the defined position in the defined layout of the node array.

In some embodiments, the method can include determining a change to make to the position of the node to make the position of the node match the defined position in the defined layout of the node array. In an example, the change can include moving the node by a distance to match the position of the node to the defined position in the defined layout of the node array.

In some embodiments, the method can include detecting whether the node is operational. In an example, the defined layout of the node array can include identifications for each node that is associated with each defined position, respectively, and the locating device can receive data from each node that includes the identification for each node. The locating device can then determine whether identifications for each node specified in the defined layout have been received from each node. If an identification is not received from a node, an indication can be made that a problem exists with the node (e.g., the node is not operational). As such, a health of the node array can be verified against the defined layout of the node array.

Figure 3:
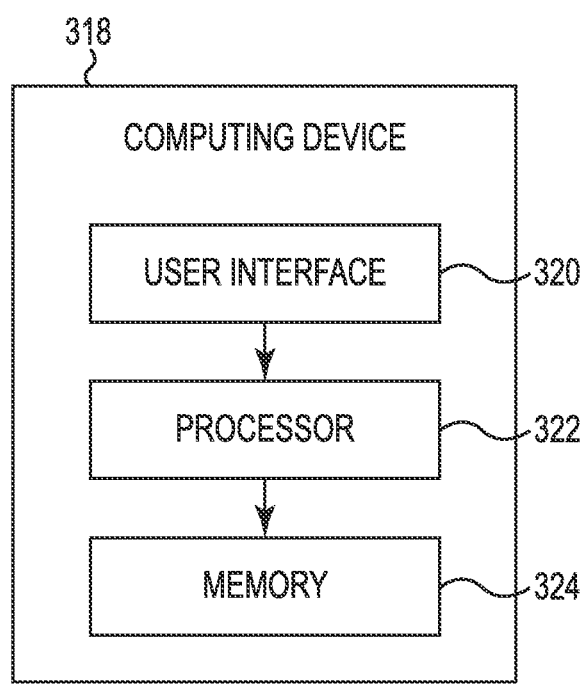
FIG. 3 illustrates a computing device for analyzing a network topology according to one or more embodiments of the present disclosure.

FIG. 3 illustrates a computing device for analyzing a network topology according to one or more embodiments of the present disclosure. Computing device 318 can be used to perform the method as discussed in relation to FIG. 2. As shown in FIG. 3, computing device 318 includes a user interface 320. User interface 320 can be a graphic user interface (GUI) that can provide (e.g., display and/or present) and/or receive information (e.g., data and/or images) to and/or from a user (e.g., operator) of computing device 318. For example, user interface 320 can include a screen that can provide information to a user of computing device 318 and/or receive information entered into a display on the screen by the user. However, embodiments of the present disclosure are not limited to a particular type of user interface.

As shown in FIG. 3, computing device 318 includes a processor 322 and a memory 324 coupled to the processor 322. Memory 324 can be any type of storage medium that can be accessed by the processor 322 to perform various examples of the present disclosure. For example, memory 324 can be a non-transitory computer readable medium having computer readable instructions (e.g., computer program instructions) stored thereon that are executable by the processor 322 to analyze a network topology according to one or more embodiments of the present disclosure.

Memory 324 can be volatile or nonvolatile memory. Memory 324 can also be removable (e.g., portable) memory, or non-removable (e.g., internal) memory. For example, memory 324 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 324 is illustrated as being located in computing device 318, embodiments of the present disclosure are not so limited. For example, memory 324 can also be located internal to another computing resource (e.g., enabling computer readable instructions to be downloaded over the Internet or another wired or wireless connection).

Processor 322 can execute the executable instructions stored in memory 324 in accordance with one or more embodiments of the present disclosure. For example, processor 322 can execute the executable instructions stored in memory 324 to receive data from a node in a node array with a locating device. The data can include time of flight data, signal strength data, and/or directional signal data.

In an example, the data can be received by the locating device at a plurality of different positions of the locating device. As discussed herein, receiving the data at a plurality of different positions of the locating device can allow for the position of the node to be triangulated based on the data received from the node.

In some embodiments, processor 322 can execute the executable instructions stored in memory 324 to determine a position of the locating device on a node array map. As discussed herein, the position of the locating device on the node array map can be determined by a user and/or determined automatically.

In some embodiments, processor 322 can execute the executable instructions stored in memory 324 to determine a position of the node in relation to the locating device based on the data received from the node and the position of the locating device on the node array map at each of the plurality of different positions of the locating device.

In an example, the time of flight data can be received from the plurality of positions with the locating device. The time of flight data can then be used to triangulate the position of the node in the node array. For instance, the time of flight data for the signal from the first node can be received by the locating device at the first position of the locating device and the second position of the locating device.

Based on the speed of the signal and the time of flight for the signal from the node, the distance between the first node and the first position of the locating device and the distance between the first node and the second position of the locating device can be determined, which can be used to determine the position of the first node based on the distance between the first position of the locating device and the second position of the locating device. In an example, the position of the first node can be determined on the node array map and coordinates can be associated with the position of the node.

In some embodiments, the computing device 318 can include a location determination engine. The location determination engine can represent generally any combination of hardware and programming configured to determine the position of the node. In an example, the location determination engine can determine the position of the node based on data received from the node, which can include time of flight data of a signal from the node, signal strength data, and/or directional signal data, as discussed herein.

In some embodiments, processor 322 can execute the executable instructions stored in memory 324 to compare the position of the node to a defined layout of the node array and determine whether the position of the node matches a defined position in the defined layout of the node array. In an example, the coordinates associated with the position of the node can be compared to coordinates associated with the defined position in the defined layout of the node array.

If the coordinates are within a defined range from one another, a determination can be made that the position of the node matches the defined position in the defined layout of the node array. For example, if the coordinates of the node are within one foot of the coordinates of the defined position in the defined layout of the node array, an indication that the position of the node matches the defined position in the defined layout of the node array can be provided.

Alternatively, and/or in addition if the coordinates are not within the defined range from one another, a determination can be made that the position of the node does not match the defined position in the defined layout of the node array and an indication that the position of the node does not match the defined position in the defined layout of the node array can be provided. In an example, a change to make to the position of the node to match the position of the node to the defined position in the defined layout of the node array can be provided.

In some embodiments, a health of the node array can be determined. For example, a determination of whether the locating device is receiving data from the node in the node array can be made and an indication of whether the node is operational can be provided. In a manner analogous to that discussed in relation to FIG. 2, the locating device can determine whether identifications for each node specified in the defined layout have been received from each node.

If a determination is made that the locating device is not receiving data from the node in the node array, an indication that the node in the node array is not operational can be made. Alternatively, and/or in addition, if a determination is made that the locating device is receiving data from the node in the node array, an indication that the node in the node array is operational can be made Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method for analyzing a network topology;
receiving data from a node in a node array with a locating device, wherein the data is received by the locating device at a plurality of different positions between a first point and a second point of a path throughout the node array, wherein the data from the node includes a time of flight data of a signal from the node;
determining a position of the locating device;
determining a position of the node in relation to the locating device based on the data received from the node and the position of the locating device on the node array map at each of the plurality of different positions of the locating device, wherein determining the position of the node includes triangulating the position of the node in the node array using the time of flight data of the signal of the node from the plurality of different positions of the locating device;
comparing the position of the node to a defined position in the defined layout of the node array; and
determining whether the position of the node matched the defined position in the defined layout of the node array.

2. The method of claim 1, wherein the method includes receiving data from the node in the node array from a plurality of positions with the locating device.

3. The method of claim 1, wherein determining the position of the locating device includes determining the position of the locating device on a node array map.

4. The method of claim 3, wherein determining the position of the locating device includes determining the position of the locating device on the node array map based on a position of the locating device entered by a user.

5. The method of claim 1, wherein the method includes triangulating the position of the node using the received data from the node in the node array from the plurality of positions and the position of the locating device.

6. The method of claim 1, wherein the method includes determining a change to make the position of the node to make the position of the node match the defined position in the defined layout of the node array.

7. The method of claim 1, wherein the node is at least one of a sensor, camera, and wireless router.

8. The method of claim 6, wherein the sensor is a smoke detector.

9. The method of claim 1, wherein the method includes detecting whether the node is operational.

10. A machine-readable non-transitory medium storing instructions for analyzing a network topology, executable by a machine to cause the machine to:
receive data from a node in a node array with a locating device, wherein the locating device is moved from a first point to a second point along a path and wherein the data is received by the locating device at a plurality of different positions between the first point and the second point along the path of the locating device, wherein the data from the node includes a time of flight data of a signal from the node;

determine a position of the locating device on a node array map;

determine a position of the node in relation to the locating device based on the data received from the node and the position of the locating device on the node array map at each of the plurality of different positions of the locating device, wherein determining the position of the node includes triangulating the position of the node in the node array using the time of flight data of the signal of the node from the plurality of different positions of the locating device;

compare the position of the node to a defined layout of the node array; and determine whether the position of the node matches a defined position in the defined layout of the node array.

11. The medium of claim 10, wherein the instructions are executable by the machine to provide an indication that the position of the node matches the defined position in the defined layout of the node array.

12. The medium of claim 10, wherein the instructions are executable by the machine to:

provide an indication that the position of the node does not match the defined position in the defined layout of the node array; and determine a change to make the position of the node to match the position of the node to the defined position in the defined layout of the node array.

13. The medium of claim 10, wherein instructions are executable by the machine to receive data from the node in the node array that includes directional signal data.

14. The medium of claim 10, wherein instructions are executable by the machine to receive data from the node in the node array that includes directional signal data.

15. The medium of claim 10, wherein instructions are executable by the machine to:

determine that the locating device is not receiving data from the node in the node array; and provide an indication that the node in the node array is not operational.

16. A system for analyzing a network topology, the system comprising a processing resource in communication with a non-transitory computer-readable medium, wherein the computer-readable medium contains a set of instructions and wherein the processing resource is designed to execute the set of instructions to:

receive data from a node in a node array with a locating device, wherein the locating device is moved from a first point to a second point along a path and wherein the data is received by the locating device at a plurality of different positions between the first point and the second point along the path, wherein the data from the node includes a time of flight data of a signal from the node;

determine a position of the locating device on a node array map;

determine a position of the node in relation to the locating device based on the data received from the node and the position of the locating device on the node array map, wherein determining the position of the node includes triangulating the position of the node in the node array using the time of flight data of the signal of the node from the plurality of different positions of the locating device;

determine whether the position of the node matches a defined position in a defined layout of the node array; and determine a change to make the position of the node to match the position of the node to the defined position in the defined layout of the node array.

17. The system of claim 16, wherein the determined change to make to the position of the node includes a determination of a distance to move the node to match the position of the node to the defined position in the defined layout of the node array.

18. The system of claim 16, wherein the position of the locating device on a erode array map is determined automatically.

19. The system of claim 16, wherein a prompt is provided by the locating device to a user to enter the position of the locating device.

* * * * *